May 17, 1966 S. G. KNIGHT 3,251,304
VARIABLE VOLUME PUMP CONTROL
Filed Aug. 5, 1963
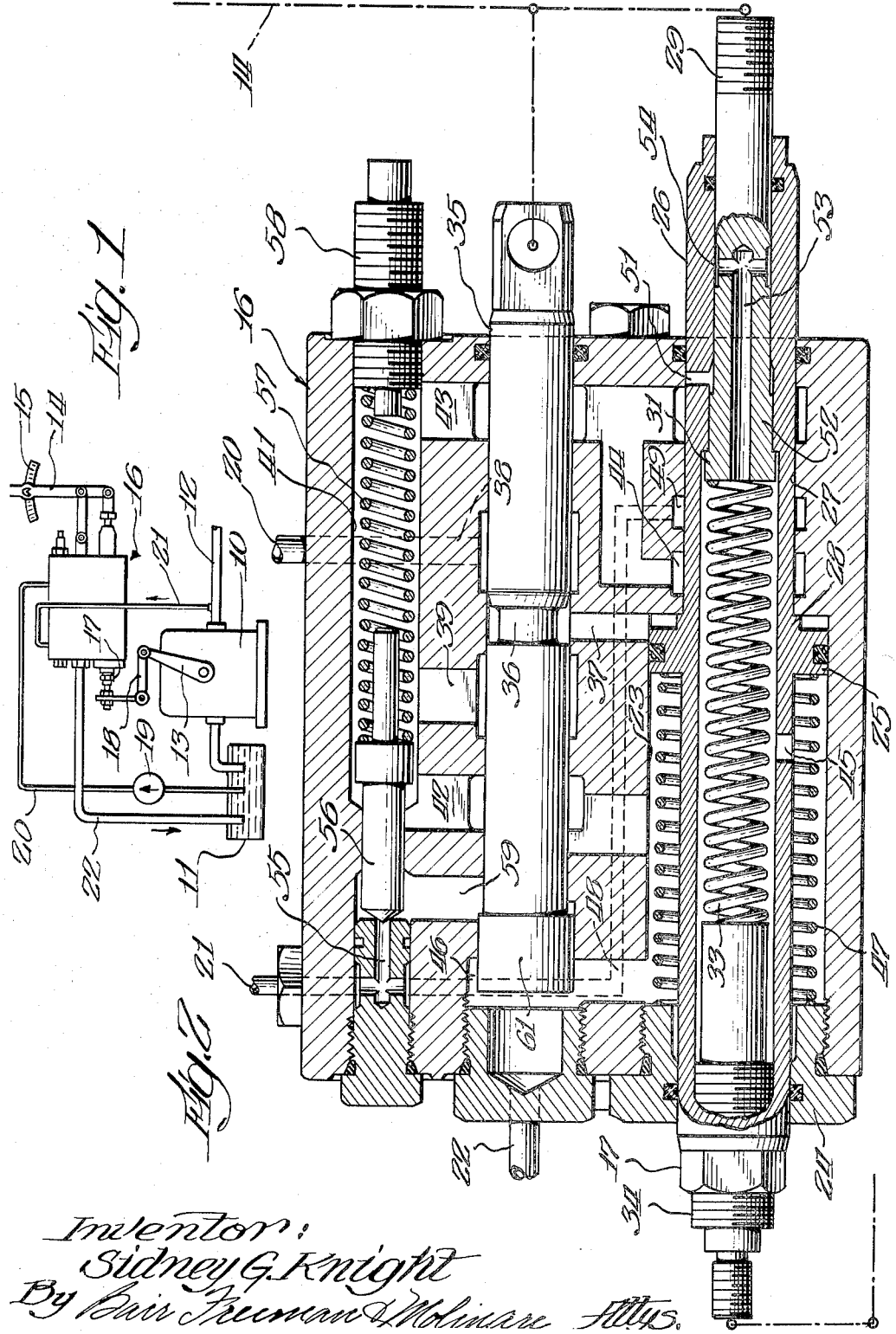
Inventor:
Sidney G. Knight
By Bair Freeman & Molinare Attys.

United States Patent Office 3,251,304
Patented May 17, 1966

3,251,304
VARIABLE VOLUME PUMP CONTROL
Sidney G. Knight, Schofield, Wis., assignor to Drott Manufacturing Corporation, Milwaukee, Wis., a corporation of Wisconsin
Filed Aug. 5, 1963, Ser. No. 299,996
6 Claims. (Cl. 103—37)

This invention relates to variable volume pump controls and more particularly to control apparatus for accurately maintaining the volume adjustment of such a control and for limiting the total horse power output of the variable volume pump with which it is associated.

Variable volume pumps as utilized for operating various types of devices such as material handling equipment are sometimes called upon to deliver a high volume of fluid at a relatively low pressure, at other times to deliver a relatively smaller volume of fluid at high pressure, and occasionally to deliver a high volume of fluid at high pressure. In the last case the pump may be required to absorb more horse power than it is capable of handling or that the driving motor can deliver with the result that either the pump or motor may be burned out or otherwise damaged. The alternate is to limit the pump pressure or volume to a volume less than that of which it is capable under optimum conditions or to use a pump driving motor large and rugged enough to handle the maximum operating conditions. The former solution results in a loss of efficiency while the latter increases the size and weight and consequently the cost of the pump installation.

Another difficulty with pump operating controls as heretofore constructed is accurate maintenance of the desired volume setting. The controls sometimes have a tendency to drift with the result that the volume setting will also drift and will not remain at the desired volume.

It is accordingly an object of the present invention to provide a variable volume pump control which will accurately maintain the desired volume setting and which will function to limit the total horse power output of the pump without unnecessarily limiting either volume or pressure. Another object is to provide a variable volume pump control in which the volume delivered by the pump is limited in proportion to the pressure only when the volume exceeds some predetermined amount.

Still another object is to provide a variable volume pump control in which the volume delivered by the pump is automatically reduced to a minimum whenever the pressure exceeds a maximum limiting volume.

According to a feature of the invention, the variable volume pump control is operated through a fluid powered booster which is controlled by a manually operable control member and which multiplies the force exercised by the control member to adjust the volume control of the pump. The power booster functions to return the pump control to the desired setting automatically in the event there should be any tendency to drift so that the pump will be accurately maintained at the set value. Furthermore, the booster is operated automatically in response to extreme volume or pressure conditions to limit the horse power which the pump can be called upon to deliver.

The above and other objects and features of the invention will be more readily apparent from the following description when read in connection with the accompanying drawing in which:

FIG. 1 is a diagrammatic view of a variable volume pump control embodying the invention; and FIG. 2 is a section through the pump control booster mechanism.

As shown in FIG. 1, the variable volume control of the invention may be utilized with a conventional variable volume pump of any desired type indicated generally at 10. The pump may draw liquid from a tank or sump indicated at 11 and deliver the liquid to a desired point of use such as various material handling appliances on a tractor vehicle through a discharge conduit 12. The pump is adjustable to vary the volume of liquid delivered thereby through an adjusting lever 13 which is turned in one direction or the other to vary the pump volume.

The desired volume setting is adjusted manually through a control lever 14 movable over a scale 15 and preferably held in a desired position relative to the scale by a spring detent or the like. The lever 14 controls a booster device indicated generally at 16, which includes a power operated plunger 17 connected through a link 18 to the pump volume control lever 13. The booster receives operating fluid under pressure from a pump 19 through a conduit 20 generally operating at a lower pressure than the pump 10 and which may also furnish actuating fluid for hydraulic steering or other control mechanisms on the tractor. For example, the main pump 10 may deliver pressure on the order of 3,000 to 5,000 p.s.i. while the auxiliary pump 19 may deliver pressure on the order of 200 p.s.i. The booster also is connected through a conduit 21 to the discharge conduit 12 of the main pump 10 to be responsive to the main pump pressure. Fluid from the booster returns to the tank or sump through a conduit 22.

As best seen in FIG. 2, the booster comprises a body drilled to provide a cylinder 23 through which the plunger 17 extends with a seal 24, sealing the space around the plunger. The plunger is provided with an enlarged piston 25, which is slidable in the cylinder 23 and has a reduced end portion 26 extending through a second and smaller bore 27 in the body through the opposite end of the body. Preferably a shoulder 28 is formed adjacent to the piston 25 to engage the shoulder joining the bores 23 and 27 to hold the piston 25 spaced outwardly from the shoulder between the bores 23 and 27 so that fluid may act on the piston 25.

A second plunger 29 is slidable through the extension 26 of the first plunger 17 and is provided with an enlarged end portion 31 engaging an internal shoulder in the plunger 17 to limit its movement toward the right as seen in FIG. 2. A spring 33 seats against the end of the plunger 29 and against an adjustable abutment 34 threaded into the opposite end of the plunger 17 to urge the plunger 29 toward the right to its seated position as shown. By adjusting the abutment 34 the maximum pressure which the pump can be called upon to deliver is adjusted as will appear more fully hereinafter.

Supply of actuating fluid to the cylinder 23 is controlled by a slidable valve plunger 35, which is slidable in a bore in the booster body parallel to the bores 23 and 27. The valve plunger 35 is formed with a central reduced portion 36 which can function when the plunger is shifted in one direction or another from its neutral position to connect a passage 37 opening to the right end of the piston 25 either to a fluid supply passage 38 or to an exhaust passage 39. The exhaust passage 39 communicates with a third bore 41 in the booster body which also communicates through passages 42 with the bores 23 and 43 with a port 44 opening into the bore 27 closely adjacent to the bore 23. The interior of the bore in the plunger 17 communicates through a port 45 with the bore 23, which in turn communicates with a space 46 at the left end of the valve plunger 35, to which the exhaust conduit 22 is connected. When the valve plunger 35 is moved to the right, will establish communication between the passages 37 and 38, which latter passage communicates with the conduit 20 so that pressure from the pump 19 will be applied to the right side of the piston 25 to urge it to the left against a return spring 47.

When the plunger 35 is moved to the left, it will establish communication between the passages 37 and 39 to exhaust fluid from the right side of the piston 25 so that the spring 47 can return the plunger 17 to the right.

The conduit 21 which supplies pressure from the main pump 10 communicates through a passage 48 in the body with a port 49 opening into the bore 27 to the right of the port 44. The ports 44 and 49 are adapted to register under certain operating conditions with the port 51 in the reduced extension 26 of the plunger 17. The port 51 opens into a stepped bore in the plunger extension at the point where the bore diameter changes and the plunger 29 as shown is provided with an enlarged portion 52 adjacent to the enlarged stop 31 thereon, which fits into the enlarged part of the stepped bore. The plunger 29 is itself formed with a passage 53 terminating in a cross passage 54 adjacent to its right end which can register with the port 51 under extreme conditions.

The conduit 21 additionally communicates with a passage 55 terminating in a pressure relief port which is normally closed by a valve plunger 56. The valve plunger 56 extends into the bore 41 as shown and is engaged by a spring 57 in the bore which urges it against its seat. The spring 57 seats against an adjustable plug 58 by which the spring pressure can be adjusted, thereby to adjust the maximum output pressure of the main pump 10.

When the valve 56 is unseated, it admits main pump pressure to a passage 59, which opens around the left end of the valve plunger 35. The left end of the valve plunger is formed with an enlargement 61 fitting slidably into an enlarged bore in the housing between passages 59 and the space 46 for a purpose to appear more fully later. The operating lever 14 as diagrammatically indicated in FIG. 2 is pivotally connected at its lower end to the second plunger 29 and intermediate its ends to the valve plunger 35. The control lever therefore operates in the manner of a differential link normally pivoting about its connection to the plunger 29 when it is initially moved to move the valve plunger 35 and pivoting about its set position on the scale 15 when the operating plunger 17 subsequently moves to return the valve plunger to its set position.

In operation with the parts in the position shown in FIG. 2, the pump 10 will be set for minimum volume. To increase the volume, the operating lever 14 is moved to the right or clockwise to shift the valve plunger to the right. This will establish communication between the passages 37 and 38 to admit actuating pressure from conduit 20 to the right side of the piston 25, thereby to shift the operating plunger 17 to the left and turn the adjusting lever 13 of the pump 10 to increase the pump volume. This movement of the operating plunger 17 will move the lower end of the lever 14 to the left, thereby moving the valve plunger 35 to the left to return it to its neutral position as shown. This will close off the passage 37, trapping liquid between the right end of bore 23 and piston 25 to lock it in its adjusted position.

However, if there should be any leakage or any other conditions tending to cause the control to drift from the desired volume setting, the valve plunger will again be moved to the right by movement of the operating plunger 17 to the right to again supply actuating fluid to the piston 25 to move it back to the desired position. If for any reason the actuating plunger 17 should be moved too far to the left, the valve plunger will open the passage 37 to the exhaust passage 39, thereby venting some of the trapped fluid and allowing the actuating plunger to move back to the right to the set position. To reduce the pump volume, the control lever 14 is swung to the left, thereby reversing the action described above and venting the passage 37 so that the spring 47 can return the operating plunger 17 to the right. In this way, a very accurate control of the volume adjustment is maintained with a minimum manual operating force being required on the lever 14. When the control has been adjusted to produce a predetermined pump volume, for example, on the order of 75% pump capacity, the port 51 will have moved into registration with the port 49 so that fluid from the main pump 10 at the existing pressure will be supplied to the right end of the enlargement 52 on plunger 29. This pressure will tend to urge the plunger 29 to the left against the spring 33 and in the event the pressure demand on pump 10 should become large enough to overcome the spring 33 the plunger 29 will move in the plunger 17. This will produce the same effect as a movement of the plunger 17 too far to the left and will shift the valve plunger 35 to the left to connect the passage 37 to the exhaust passage 39. The plunger 17 will therefore be returned to the right to reduce the pump volume adjustment an amount proportional to the amount by which the pump pressure exceeds the setting of the spring 33. Thus at no time can the control be adjusted to require both a high volume and high pressure from the pump in excess of a predetermined horse-power. The maximum horse power setting is adjusted by adjusting the spring 33 so that the demand can never exceed the horse power of which the pump or its driving motor is capable, thereby protecting both the pump and the driving motor.

Excessive movement of the plunger 29 in response to pump pressure is prevented by bore 53 and cross bore 54. With the ports 49 and 51 in registration, if the plunger 29 moves to the point where the cross bore 54 registers with the port 51, the high pressure will be admitted through the bores 53 and 54 and will be conducted to exhaust through the port 45, bore 23 and space 46. In this way the pressure acting on the enlargement 52 of the plunger 29 will be limited to limit movement of the plunger and to prevent excessive movement thereof.

In the event the pressure demands on the pump 10 should exceed a predetermined high volume corresponding to the maximum designed pressure, the valve 56 will unseat and admit fluid under the high pump pressure to the passage 59. This pressure will act on the right end of the enlargement 61 on the valve plunger 35 and move the valve plunger to the left to connect the passage 37 to the exhaust passage 39. Under these conditions, the actuating plunger 17 will be returned to the right to the minimum flow position shown and will maintain the pump flow at the minimum as long as the valve 56 remains open. When the peak pressure is reduced sufficiently to permit the valve 56 to again close, the pressure in the passage 59 will be relieved by leakage around the enlarged portion 61 on the valve plunger or through a restricted port provided for that purpose and the apparatus will return to its normal operating condition. In this way the pump is protected against excessive pressure demands by reducing its volume to minimum or to zero at any time the pressure demand exceeds the maximum pressure of which the pump is capable.

While one embodiment of the invention has been shown and described in detail, it will be understood that this is illustrative only and is not to be taken as a definition of the scope of the invention, reference being had for this purpose to the appended claims.

What is claimed is:

1. A control for a variable volume pump comprising a housing, a movable operating member adapted in the housing to be connected to the volume control of a pump, a second member movable in the same direction as and relatively to the operating member, stop means to limit movement of the second member relative to the operating member in one direction, resilient means normally urging the second member against the stop means whereby the two members normally move together, a movable control member in the housing normally occupying a neutral position, means operated by movement of the control member to move the operating member, differential means connecting the control member and the second member to move the control member about the second member as a fulcrum and to return the control member to its neutral position when the second member moves with the operating member, and means effective after the operating member has moved to a position corresponding to a predetermined pump volume to move the second member relative to the operating member an amount proportional to the pump pressure.

2. The control of claim 1 including a pressure responsive valve opening in response to a predetermined pump pressure to supply actuating fluid to the pressure responsive device to move the control member in a direction to cause the operating member to move in a direction to reduce the pump volume.

3. A control for a variable volume pump comprising a movable plunger adapted to be connected to the volume control of a variable volume pump, a second plunger movable longitudinally of the first named plunger, stop means to limit movement of the second plunger in one direction relative to the first named plunger, resilient means urging the second plunger in said one direction against the stop means whereby the two plungers normally move together, a control plunger movably mounted adjacent to the first named plunger, means controlled by movement of the control plunger from a neutral position to cause movement of the first named plunger, operating linkage connecting the second plunger and the control plunger for moving the control plunger relative to the second plunger as a fulcrum and for returning the control plunger to its neutral position as the second plunger moves with the first plunger, means effective when the first plunger is moved to a position corresponding to a predetermined pump volume to move the second plunger relative to the first plunger an amount proportional to the existing pump pressure, and means responsive to movement of the second plunger to a predetermined position relative to the plunger to render the last named means ineffective.

4. A control for a variable volume pump comprising a housing, a movable plunger in the housing adapted to be connected to the volume control of a variable volume pump, a second plunger movable longitudinally of the first named plunger, stop means to limit movement of the second plunger in one direction relative to the first named plunger, resilient means urging the second plunger in said one direction against the stop means whereby the two plungers normally move together, a control plunger mounted in the housing for movement parallel to the first and second plungers, a differential control link pivoted at spaced points to the second plunger and the control plunger to produce a movement of the second plunger with the first plunger proportional to movement of the control link, and means effective after the first plunger has moved to a position corresponding to a predetermined pump volume to move the second plunger relative to the first plunger an amount proportional to the pump pressure.

5. A control for a variable volume pump comprising a casing, an operating plunger slidable in the casing and having an offset bore therein, a second plunger fitting slidably in the operating plunger and having an enlarged piston portion slidable in the larger portion of the offset bore, a spring urging the second plunger in one direction in the bore, stop means to limit movement of the second plunger in said one direction so that the two plungers normally move together, a control plunger slidable in the casing and normally occupying a neutral position, means controlled by movement of the control plunger from its neutral position to move the opening plunger, differential means connecting the second plunger and the control plunger to cause a movement of the operating and second plunger proportional to movement of the differential means, there being a port in the casing adjacent to the operating plunger connected to the pump to receive fluid under pressure therefrom and a port in the operating plunger registering with the last named port when the operating plunger is in a position corresponding to a predetermined pump volume and supplying fluid to the larger portion of the bore in the operating plunger to move the second plunger in the bore.

6. The control of claim 5 in which the operating plunger carries a piston slidable in a bore in the casing, a spring urges the piston and operating plunger in one direction, and the control plunger controls supply and exhaust of actuating fluid under pressure to one side of the piston to urge the operating plunger in the other direction.

References Cited by the Examiner

UNITED STATES PATENTS

| 1,753,562 | 4/1930 | Ferris | 60—52 |
| 1,760,915 | 6/1930 | Robson | 60—52 |
| 1,974,138 | 9/1934 | Ferris et al. | 60—52 |
| 2,184,665 | 12/1939 | Ernest | 60—52 |
| 2,472,547 | 6/1949 | Purcell | 60—52 |
| 2,552,604 | 5/1951 | Thoma | 60—52 |
| 2,941,365 | 6/1960 | Carlson et al. | 60—52 |
| 3,017,750 | 1/1962 | Kempson | 103—1 |
| 3,057,162 | 10/1962 | Lee | 103—1 |

SAMUEL LEVINE, Primary Examiner.

DONLEY J. STOCKING, Examiner.

W. L. FREEH, Assistant Examiner.